United States Patent
Caley et al.

(10) Patent No.: US 12,071,909 B2
(45) Date of Patent: Aug. 27, 2024

(54) FUEL-AIR REGULATOR LOCATION

(71) Applicant: ORBITAL AUSTRALIA PTY LTD, Balcatta (AU)

(72) Inventors: David James Caley, City Beach (AU); John Howard Tubb, Befordale (AU); Mario Charles Muscat, Ballajura (AU); Arminta Chicka, Ellenbrook (AU)

(73) Assignee: ORBITAL AUSTRIALIA PTY LTD, Balcatta (AU)

( * ) Notice: Subject to any disclaimer, the term of this patent is extended or adjusted under 35 U.S.C. 154(b) by 0 days.

(21) Appl. No.: 17/623,515

(22) PCT Filed: Jun. 29, 2020

(86) PCT No.: PCT/AU2020/050675
§ 371 (c)(1),
(2) Date: Dec. 28, 2021

(87) PCT Pub. No.: WO2020/257884
PCT Pub. Date: Dec. 30, 2020

(65) Prior Publication Data
US 2022/0356856 A1 Nov. 10, 2022

(30) Foreign Application Priority Data

Jun. 28, 2019 (AU) ................................ 2019902274

(51) Int. Cl.
*F02D 41/30* (2006.01)
*B64C 39/02* (2023.01)
(Continued)

(52) U.S. Cl.
CPC ............ *F02D 41/30* (2013.01); *B64C 39/024* (2013.01); *F02M 67/02* (2013.01); *B64U 50/11* (2023.01); *F02D 2041/3088* (2013.01)

(58) Field of Classification Search
CPC ....... B64C 39/024; B64U 50/11; F02B 61/04; F02D 2041/3088; F02D 41/30; F02M 67/02
See application file for complete search history.

(56) References Cited

U.S. PATENT DOCUMENTS 1,001,012 A * 8/1911 Fowler ..................... B25D 9/08
60/542
4,756,293 A * 7/1988 Suzuki ................ F02D 35/0007
123/531

(Continued)

FOREIGN PATENT DOCUMENTS

WO  WO-2013181709 A1 * 12/2013 ............... F01M 1/02
WO  WO-2017161422 A1 *  9/2017 ............. F02M 19/03
WO  WO-2019051559 A1 *  3/2019 ........... F02D 41/062

OTHER PUBLICATIONS

International Search Report and Written Opinion of the International Searching Authority, issued in PCT/AU2020/050675, mailed Jul. 20, 2020; ISA/AU.

(Continued)

*Primary Examiner* — Carl C Staubach
(74) *Attorney, Agent, or Firm* — Harness, Dickey & Pierce, PLC

(57) ABSTRACT

A dual-fluid injection system for an internal combustion engine, and an unmanned aerial vehicle (UAV) powered by an engine having the dual-fluid injection system. The dual-fluid injection system comprises a liquid fuel metering device and a fluid delivery device operating in tandem. A gas supply system comprising an air compressor and an air delivery path extending between the air compressor and the fluid delivery device is provided to supply pressurised air to the fluid delivery device. The gas supply system comprises an air compressor and an air delivery path extending between the air compressor and the fluid delivery device. A (Continued)

fuel supply system is adapted to deliver liquid fuel to the liquid fuel metering device. A fuel-air regulator is provided for regulating fuel pressure with reference to air pressure to establish and maintain a requisite pressure differential between the fuel pressure and the air pressure. The fuel-air regulator is located remotely from the fluid delivery device and more particularly in close proximity to the air compressor. In a preferred arrangement, the fuel-air regulator is mounted on or integrated with the air compressor or a part thereof.

18 Claims, 3 Drawing Sheets

(51) Int. Cl.
*F02M 67/02* (2006.01)
*B64U 50/11* (2023.01)

(56) References Cited

U.S. PATENT DOCUMENTS

| | | | | |
|---|---|---|---|---|
| 4,993,394 A | * | 2/1991 | McKay | F02M 51/08 |
| | | | | 123/531 |
| 5,087,824 A | * | 2/1992 | Nelson | H02P 9/04 |
| | | | | 290/1 R |
| 5,094,217 A | * | 3/1992 | Kaku | F02F 7/008 |
| | | | | 123/41.31 |
| 5,156,133 A | * | 10/1992 | Sugimoto | F02M 39/00 |
| | | | | 123/585 |
| 5,226,399 A | * | 7/1993 | Ozawa | F02B 33/04 |
| | | | | 123/198 C |
| 5,289,812 A | * | 3/1994 | Trombley | F02M 67/02 |
| | | | | 123/533 |
| 5,375,578 A | * | 12/1994 | Kato | F02M 55/007 |
| | | | | 123/533 |
| 5,404,858 A | * | 4/1995 | Kato | F02M 37/20 |
| | | | | 123/456 |
| 7,370,643 B2 | | 5/2008 | Hanawa | |
| 9,091,241 B2 | | 7/2015 | Ohmori | |
| 10,184,440 B2 | | 1/2019 | Caley | |
| 2014/0193284 A1 | * | 7/2014 | Stephan | F16K 31/1223 |
| | | | | 418/201.2 |

OTHER PUBLICATIONS

International Preliminary Report on Patentability (Chapter II) issued in PCT/AU2020/050675, mailed Sep. 1, 2021; IPEAU.

* cited by examiner

FUEL-AIR REGULATOR LOCATION

CROSS REFERENCE TO RELATED APPLICATIONS

This application is a U.S. National Phase Application under 35 U.S.C. 371 of International Application No. PCT/AU2020/050675 filed on Jun. 29, 2020, which claims the benefit of priority from Australian Patent Application No. 2019902274 filed Jun. 28, 2019. The entire disclosures of all of the above applications are incorporated herein by reference.

TECHNICAL FIELD

This invention relates to a dual-fluid injection system for an internal combustion engine. The invention also relates to an engine having a dual-fluid injection system.

The invention has been devised particularly, although not necessarily solely, for use with engines of the type used on unmanned aerial vehicles (UAVs), including in particular small, single cylinder reciprocating piston two-stroke engines, although it can of course also be used on any other appropriate internal combustion engine.

BACKGROUND ART

The following discussion of the background art is intended to facilitate an understanding of the present invention only. The discussion is not an acknowledgement or admission that any of the material referred to is or was part of the common general knowledge as at the priority date of the application.

As mentioned above, the invention is particularly applicable to an engine of a UAV. Accordingly, it will be convenient to hereinafter disclose the invention in relation to that exemplary application. However, it is to be appreciated that the invention is not limited to that application and may be used in other applications.

It is known to deliver fuel into a combustion chamber of an internal combustion engine using a dual-fluid direct injection system. With one such arrangement, a metered quantity of liquid fuel is delivered into a combustion chamber of the engine entrained in a gas such as air. Typically, the metered quantity of fuel is delivered into a mixing zone and then delivered into the combustion chamber with the assistance of the air flowing through the mixing zone to entrain the fuel. Such an arrangement is known as an air-assist fuel delivery system. Such a system typically involves a liquid fuel metering device, a fluid delivery device, and apparatus for conveying liquid fuel delivered from the metering device to a location for mixing with air received from a pressurised supply to provide an air-fuel mixture for injection by the fluid delivery device into a combustion chamber of an internal combustion engine. The liquid fuel metering device and the fluid delivery device may together be incorporated in a fuel rail assembly, as would readily be understood by a person skilled in the art.

In order for there to be reliability and repeatability in the fuel injection and ignition process, it is necessary that there be a controlled differential between the pressure of the supply of fuel and the pressure of the supply of air into which the fuel is to be metered for subsequent entrainment and delivery.

Typically, this requires that fuel pressure be regulated with reference to air pressure. The need to regulate the fuel pressure with reference to air pressure may be addressed by provision of a referencing regulator, as would readily be understood by a person skilled in the art. The referencing regulator will hereinafter be referred to as a fuel-air regulator.

The Applicant has previously proposed fueling an engine of a UAV by way of a dual-fluid injection system, typically configured for direct injection of a fuel-air mixture into the combustion chamber of the engine.

In such an arrangement, it is usual for the fuel-air regulator to be located in close proximity to the liquid fuel metering device and the fluid delivery device, and more particularly the fuel rail assembly. However, such a location may be problematic in certain circumstances, such as for example where the fuel-air regulator would be exposed, creating drag during flight of the UAV.

It is against this background that the present invention has been developed.

SUMMARY OF INVENTION

According to a first aspect of the invention there is provided a dual-fluid injection system for an internal combustion engine, comprising a liquid fuel metering device, a fluid delivery device, a gas supply system comprising an air compressor and an air delivery path extending between the air compressor and the fluid delivery device, a fuel supply system adapted to deliver liquid fuel to the liquid fuel metering device, and a regulator for regulating fuel pressure with reference to air pressure, wherein the regulator is located remotely from the fluid delivery device.

The air compressor may be driven by the engine, although it may also be driven by other means in certain arrangements.

Preferably, the regulator is located in close proximity to the air compressor.

The regulator may be mounted on or integrated with the compressor or a part thereof. More particularly, the compressor may have a compressor head and the regulator may be mounted on or integrated with a component of the compressor head.

The regulator may comprise an air chamber communicating with the air compressor by way of an air pressure reference path. The air pressure reference path may be separate from the air delivery path to the fluid delivery device.

The air compressor may comprise a compression chamber and a clearance chamber communicating with the compression chamber. The air reference path may communicate with the clearance chamber of the air compressor.

The regulator may be so oriented with respect to the air compressor to facilitate gravity flow of fluid (such as oil) within the reference path back into the compressor. By way of example, the regulator may be positioned above the clearance chamber of the compressor to facilitate such gravity flow back into the clearance chamber.

The air delivery path may be formed or configured in a manner providing thermal insulation to pressurised air being delivered from the compressor to the fluid delivery device. The provision of thermal insulation for the pressurised air may assist with controlling the air temperature to maintain it above the dew point of the air (and thereby avoid condensation in the air delivery path).

The air delivery path may be formed or configured in a manner to be thermally separated from the fuel supply system, thereby avoiding any potential cooling of the air by recirculating fuel.

The fuel supply system adapted to deliver liquid fuel to the liquid fuel metering device may comprise a fuel line referencing fuel to the regulator, the sizing of the fuel line being selected to ensure that no undesirable pressure changes are created along the fuel line from the intended fuel-air pressure difference. Preferably, sizing of the fuel line and corresponding connectors are selected to control the maximum pressure drop in communicating the liquid fuel metering device to the regulator to be less than 40 kPa, and more preferably less than around 20 kPa.

Preferably, communication of air pressure from the compressor to the regulator is controlled so as to not introduce any delay or fluctuation in the reference pressure at the regulator.

The volume of the air communication passages to the regulator may be selected between certain minimum and maximum volumes such that fuel regulation is responsive to changes in air pressure without causing fluctuations in reference air pressure. A reference passage volume in the range of 430 mm$^3$ to 3500 mm$^3$ may be used with a direct injection system. In a particular embodiment, a volume of 432 mm$^3$ may be used so as to ensure a responsive system whilst also minimising the size and mass of regulator and corresponding components.

As mentioned above, the regulator may be integrated with the compressor head. With such an arrangement, the regulator may be integrated in a housing adapted to be mounted on the compressor. The housing may be configured and constructed to thermally insulate air in the air chamber of the regulator from fuel in an opposed fuel chamber within the regulator. The housing may be formed of a material or materials which facilitate such thermal insulation. By way of example, the housing may be constructed at least in part using a plastics material, such as for example glass-filled nylon.

In the case of an engine of a UAV, locating the regulator remotely from the fluid delivery device may offer certain advantages, including allowing the regulator to be so positioned as to avoid creation of drag during flight of the UAV. Further, locating the regulator remotely from the fluid delivery device may be conducive to positioning of the regulator lower down within an overall engine system, thereby providing a centre-of-gravity benefit for the UAV.

According to a second aspect of the invention there is provided an internal combustion engine having a dual-fluid injection system, wherein the dual-fluid injection system is in accordance with the first aspect of the invention.

According to a third aspect of the invention there is provided a combination of an engine, an air compressor, and a dual-fluid injection system for delivering a metered quantity of liquid fuel into a combustion chamber of the engine entrained in air, wherein the dual-fluid injection system comprises a liquid fuel metering device, a fluid delivery device, an air delivery path extending between the air compressor and the fluid delivery device, a fuel supply system adapted to deliver liquid fuel to the liquid fuel metering device, and a regulator for regulating fuel pressure with reference to air pressure, and wherein the regulator is located remotely from the fluid delivery device.

Preferably, the regulator is located in close proximity to the air compressor.

The regulator may be mounted on or integrated with the compressor or a part thereof. More particularly, the compressor may have a compressor head and the regulator may be mounted on or integrated with a component of the compressor head.

The air compressor may be driven by the engine, although it may also be driven by other means in certain arrangements.

The dual-fluid injection system featured in the engine according to the third aspect of the invention may have any one or more of the features specified above in relation to the dual-fluid injection system according to the first aspect of the invention.

According to a fourth aspect of the invention there is provided a dual-fluid injection system for an internal combustion engine, comprising a liquid fuel metering device, a fluid delivery device, a gas supply system comprising an air compressor and an air delivery path extending between the air compressor and the fluid delivery device, a fuel supply system adapted to deliver liquid fuel to the liquid fuel metering device, and a regulator for regulating fuel pressure with reference to air pressure, wherein the regulator is mounted on or integrated with the air compressor or a part thereof.

According to a fifth aspect of the invention there is provided a combination of an engine, an air compressor, and a dual-fluid injection system for delivering a metered quantity of liquid fuel into a combustion chamber of the engine entrained in air, wherein the dual-fluid injection system comprises a liquid fuel metering device, a fluid delivery device, an air delivery path extending between the air compressor and the fluid delivery device, a fuel supply system adapted to deliver liquid fuel to the liquid fuel metering device, and a regulator for regulating fuel pressure with reference to air pressure, and wherein the regulator is located remotely from the fluid delivery device, wherein the regulator is mounted on or integrated with the compressor or a part thereof.

According to a sixth aspect of the invention there is provided a UAV powered by an engine having a dual-fluid injection system according to the first and fourth aspect of the invention.

According to a seventh aspect of the invention there is provided a UAV powered by an engine according to a third and fifth aspect of the invention.

BRIEF DESCRIPTION OF THE DRAWINGS

Further features of the present invention are more fully described in the following description of a non-limiting embodiment thereof. This description is included solely for the purposes of exemplifying the present invention. It should not be understood as a restriction on the broad summary, disclosure or description of the invention as set out above. The description will be made with reference to the accompanying drawings in which.

The drawings shown are not necessarily to scale, with emphasis instead generally being placed upon illustrating the principles of the present disclosure.

The figures depict an embodiment exemplifying the principles of the present disclosure. The embodiment illustrates a certain configuration; however, it is to be appreciated that the inventive principles can be implemented by way of many different configurations, as would be obvious to a person skilled in the art, whilst still embodying any of the inventive principles. These configurations are to be considered within the embodiment described herein.

DESCRIPTION OF EMBODIMENT

In the following detailed description, the present invention is described in connection with a preferred embodiment. However, to the extent that the following description is specific to a particular embodiment or a particular use of the present techniques, it is intended to be illustrative only and merely provides a concise description of the exemplary embodiment. Accordingly, the present invention is not limited to the specific embodiment described below, but rather the invention includes all alternatives, modifications, and equivalents falling within the true scope of the appended claims.

The embodiment will be described with reference to an internal combustion engine system devised particularly for use with a UAV, although it may of course have other applications.

The description of the embodiment will be made with reference to FIGS. 1 and 2. The embodiment will then be discussed briefly in contrast to a prior art system which is illustrated schematically in FIG. 3.

Figure 1:
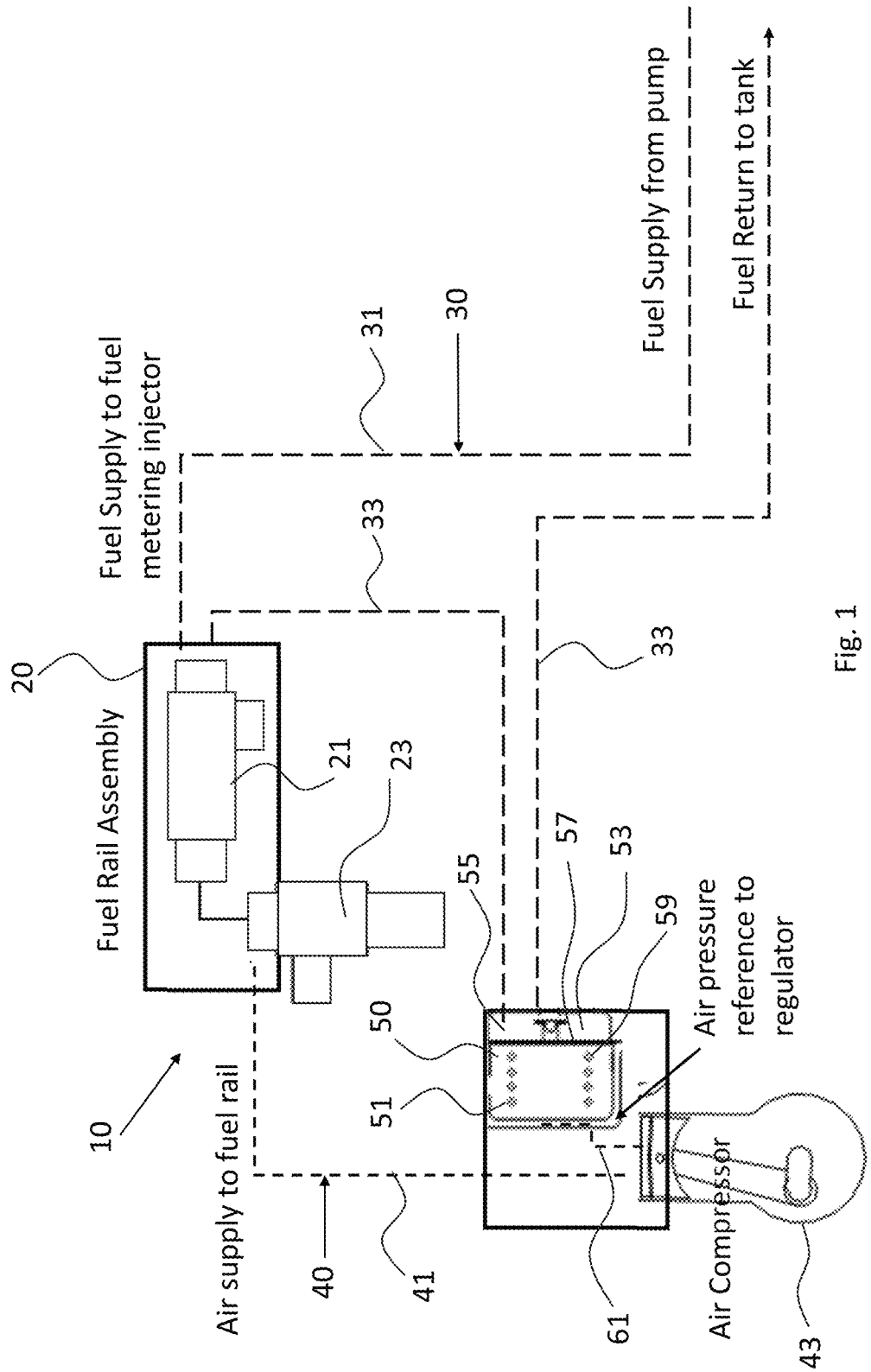
FIG. 1 is a schematic view of an embodiment of a dual-fluid direct injection system according to the invention.
Figure 2:
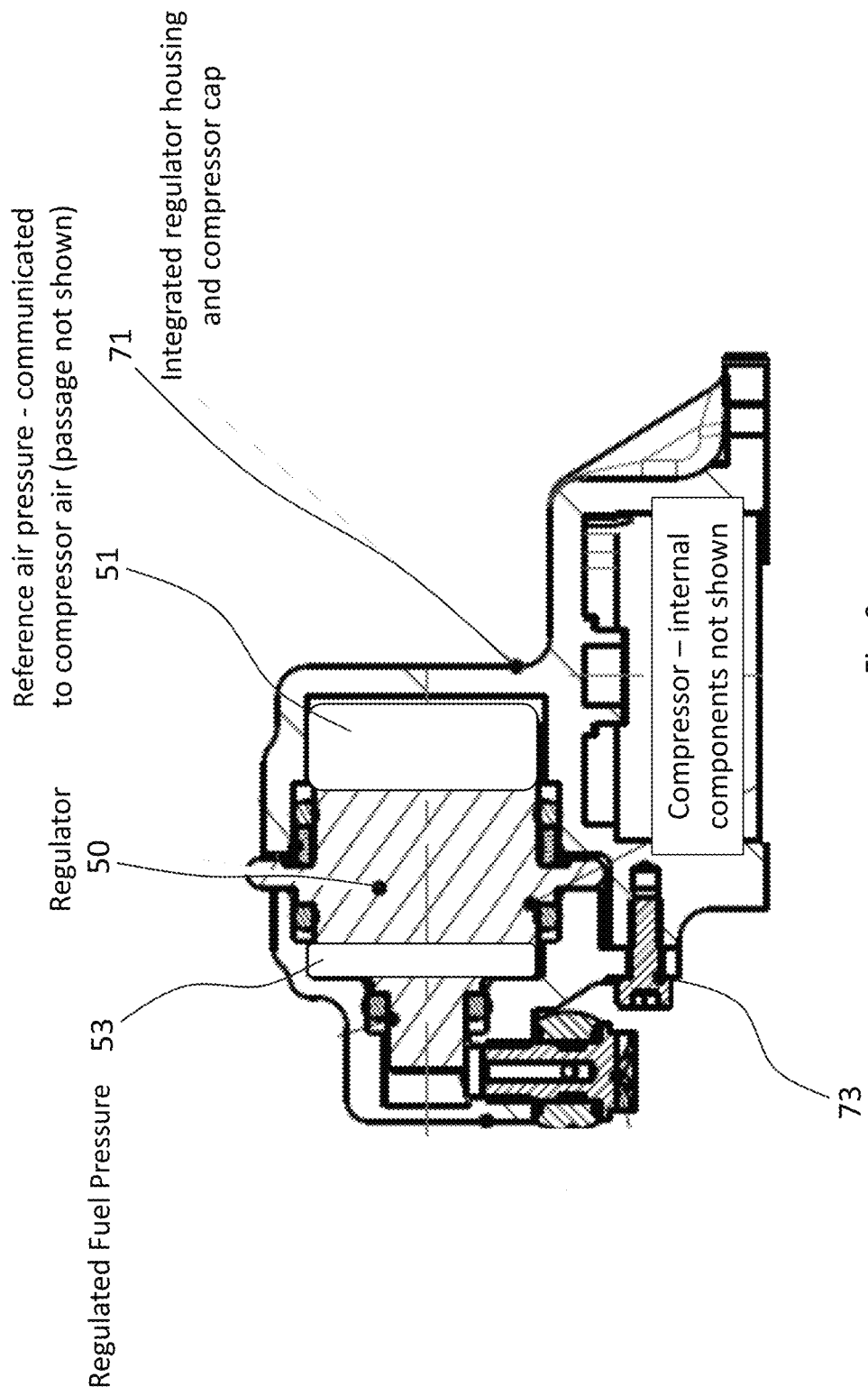
FIG. 2 is a schematic sectional view of a fuel-air regulator forming part of the dual-fluid direct injection system integrated in a housing.

Referring now to FIGS. 1 and 2, there is shown a dual-fluid direct injection system 10 for an engine of a UAV. The engine may, for example, comprise a small, single-cylinder reciprocating piston two-stroke engine operating under the control of an electronic control unit (ECU) (not shown in FIG. 1 or 2).

The dual-fluid direct injection system 10 provides an air-assist fuel delivery process wherein fuel entrained in air is delivered directly into a combustion chamber of the engine.

The dual-fluid direct injection system 10 comprises a fuel rail assembly 20 incorporating a fuel metering device 21 and a fluid delivery device 23 operating in tandem. Fuel metered from the fuel metering device 21 is delivered into a mixing zone for mixing with air received from a pressurised supply to provide an air-fuel mixture for injection by the fluid delivery device 23 into the combustion chamber. In the arrangement shown, the fuel metering device 21 comprises a fuel injector and the fluid delivery device 23 comprises a fluid delivery injector. The fuel metering device 21 and the fluid delivery device 23 are each operable in response to control signals received from the ECU. The operation of each device 21, 23 is controlled in terms of the timing of opening and the duration of opening thereof in a regime determined by the ECU.

A fuel supply system 30 is provided to deliver fuel to the dual-fluid direct injection system 10 and more particularly to the fuel metering device 21. The fuel supply system 30 includes a fuel reservoir (not shown) and an electrical fuel pump (not shown) which is also operable under the control of the ECU. The fuel supply system 30 further includes a fuel supply line 31 adapted to receive fuel from the fuel reservoir and to deliver it to the fuel metering device 21 for injection by the dual-fluid direct injection system 10, and a fuel return line 33 to return excess liquid fuel to the fuel reservoir in a known manner.

A gas supply system 40 is provided to supply pressurised air to the dual-fluid direct injection system 10. More particularly, the gas supply system 40 is operable to supply air under pressure to the fluid delivery device 23, where on opening of the fluid delivery device pressurised air can flow through the fluid delivery device 23 and be delivered into the combustion chamber of the engine. The pressurised air communicates with the mixing zone, and when the fluid delivery device 23 is opened, any fuel delivered into the mixing zone by the fuel metering device 21 is entrained by the pressurised air and delivered into the combustion chamber.

The gas supply system 40 comprises an air flow line 41 providing an air delivery path extending between the pressurised supply and the fluid delivery device 23. The pressurised supply comprises an air compressor 43. In this embodiment, the compressor 43 is driven mechanically by the engine. Other arrangements for driving the compressor 43 are however also contemplated, including for example by way of a separate drive motor (such as an electric motor).

In order for there to be reliability and repeatability in the fuel injection and ignition process, it is necessary that there be a consistent differential between the fuel pressure at the fuel metering device 21 within the fuel supply system 30 and the pressure of air in the gas supply system 40 at the time of the dual-fluid delivery event.

A fuel-air regulator 50 is provided for the purpose of establishing and maintaining the requisite differential between the fuel pressure and air pressure. The fuel-air regulator 50 does this by regulating fuel pressure with reference to air pressure. In other words, the fuel-air regulator 50 regulates the fuel pressure against the air pressure in the gas supply system 40, thereby ensuring the requisite pressure differential irrespective of the air pressure.

It is desirable that the pressure differential be in the range of 70 kPa to 300 kPa, and preferably about 250 kPa.

The fuel-air regulator 50 comprises an air chamber 51, a fuel chamber 53 and a regulator mechanism 55 therebetween, as would be understood by a person skilled in the art. The regulator mechanism 55 comprises a diaphragm 57 and a spring 59.

The fuel-air regulator 50 is located remotely from the fuel rail assembly 20 incorporating the fuel metering device 21 and the fluid delivery device 23. This is in contrast to a prior art arrangement, as will be discussed briefly further below with reference to FIG. 3. More particularly, fuel-air regulator 50 is located in close proximity to the air compressor 43. Specifically, the fuel-air regulator 50 is mounted on or is integrated with the air compressor 43, as best seen in FIG. 2.

The air chamber 51 of the fuel-air regulator 50 communicates with the air compressor 43 by way of an air pressure reference path 61. The air pressure reference path 61 is separate from the air flow line 41 providing the air delivery path extending between the air compressor 43 and the fluid delivery device 23.

The air compressor 43 may comprise a compression chamber and a clearance chamber communicating with the compression chamber, as would be understood by a person skilled in the art. The air pressure reference path 61 may communicate with the clearance chamber.

The fuel chamber 53 of the fuel-air regulator 50 communicates with fuel return line 33. In the arrangement shown, the fuel chamber 53 is incorporated along the fuel return line 33, as can be seen in FIG. 1.

The fuel-air regulator 50 may be so oriented with respect to the air compressor 43 to facilitate gravity flow of fluid accumulating within the reference path 61 back into the air compressor 43. The fluid within the reference path 61 may, for example, comprise lubrication oil liberated from the air compressor 43. In the arrangement shown, the fuel-air regulator 50 is positioned above the clearance chamber of the compressor 43 to facilitate such gravity flow.

It is also desirable in the direct injection system 10 to maintain the air supply to the fuel-air rail 20 above the dew point of the air. In situations where this is not suitably addressed, it is known for condensate to form in the reference volume to the fuel-air regulator 50 and the passages communicating with the fuel-air rail 20, which may impede air flow through these volumes/passages. Accordingly, additionally thermally insulating the air from the compressor 43 to the fuel-air rail 20 helps to minimise or prevent instances of this condensate forming.

The air flow line 41 providing the air delivery path extending between the air compressor 43 and the fluid delivery device 23 may hence be formed or configured in a manner providing thermal insulation to pressurised air being delivered from the air compressor 43 to the fluid delivery device 23. The provision of thermal insulation for the pressurised air seeks to control air temperature to maintain it above the dew point of the air (and thereby avoid condensation in the air delivery path).

The air flow line 41 providing the air delivery path may be formed or configured in a manner to be thermally separated from the fuel supply system, thereby avoiding cooling of the air by recirculating fuel.

The air flow line 41 providing the air delivery path may also need to be sized to accommodate any pressure drop in the pressured air as a consequence of the increase in length of the air delivery path owing to the remote location of the fuel-air regulator 50 with respect to fuel rail assembly 20.

In the arrangement shown in FIG. 2, the fuel-air regulator 50 is integrated with a housing 71 providing a cap 73 adapted for attachment to the compressor head or to a component forming part of the compressor head. The housing 71 may be configured and constructed to thermally insulate air in the air chamber 51 of the fuel-air regulator 50 from fuel in the opposed fuel chamber 53. The housing 71 may be formed of a material or materials which facilitate such thermal insulation. By way of example, the housing 71 may be constructed at least in part using a plastics material, such as for example glass-filled nylon.

In the embodiment discussed with reference to FIGS. 1 and 2, the sizing of fuel line 33 which references fuel to the fuel-air regulator 50 from the fuel rail assembly 20 is carefully selected to ensure that no undesirable pressure changes are created along this communication line from the intended fuel-air pressure difference. That is, during development, the Applicant noticed that if the sizing of the fuel line 33 and the corresponding connectors (not shown in FIG. 1) at each end of fuel line 33 were not selected carefully, that an undesirable high-pressure drop was created along this fuel line 33. Such an undesirable differential pressure across this fuel line 33 could be detrimental to operation of the direct injection system 10 because it can change the pressure applied to the fuel metering device 21 which can result in the metered quantity of fuel delivered by the fuel metering device 21 effectively being unregulated. As well as the effect of the sizing of the fuel line 33 itself, this undesirable differential pressure is in part due to the connectors which each effectively define an orifice at each end of the fuel line 33.

Accordingly, sizing of the fuel line 33 and the corresponding connectors is selected to control the maximum pressure drop in communicating the fuel rail assembly 20 to the fuel-air regulator 50 to be less than 40 kPa, and ideally less than around 20 kPa.

The communication of air pressure from the compressor 43 to the fuel-air regulator 50 also needs to be controlled so as to not introduce any delay or fluctuation in the reference pressure at the fuel-air regulator 50. That is, if the volume of the air communication passages to the fuel-air regulator 50 are too small, significant fluctuations in the air reference pressure and the resulting fuel pressure may result. Furthermore, if the volume of the air communication passages to the fuel-air regulator 50 are too large, significant delays communicating a change in air reference pressure may result which in turn can cause delays in achieving a desired regulated fuel pressure.

Accordingly, to achieve acceptable regulation of the fuel pressure relative to air pressure, the volume of the air communication passages to the fuel-air regulator 50 need to be carefully selected between certain minimum and maximum volumes such that fuel regulation is responsive to changes in air pressure without causing fluctuations in reference air pressure (i.e. as may result if the volume is too small). In this connection, the Applicant initially tested 3 air reference passage volumes to gauge what the volume of the air communication passages ideally required to be: a $1^{st}$ large reference volume A being 3504 $mm^3$; a 2nd reference volume B being 1797 $mm^3$; and a $3^{rd}$ small reference volume C being 432 $mm^3$. Pressure regulation was found to be satisfactory with all 3 volumes tested, suggesting that providing a reference passage volume in the range of 430 $mm^3$ to 3500 $mm^3$ was suitable for use with the direct injection system 10. For the embodiment described in FIGS. 1 and 2, the minimum volume tested (i.e. volume C being 432 $mm^3$) was selected so as to ensure a more responsive system whilst also minimising the size and mass of the fuel-air regulator 50 and corresponding components.

In this embodiment which relates to an engine of a UAV, the location of the fuel-air regulator 50 remotely from the fuel rail assembly 20 incorporating the fuel metering device 21 and the fluid delivery device 23, may offer certain advantages, including allowing the fuel-air regulator 50 to be so positioned as to avoid creation of drag during flight of the UAV. Further, locating the fuel-air regulator 50 remotely from the fluid delivery device 23 may be conducive to positioning of the fuel-air regulator 50 lower down within an overall engine system, thereby providing a centre-of-gravity benefit for the UAV.

Figure 3:
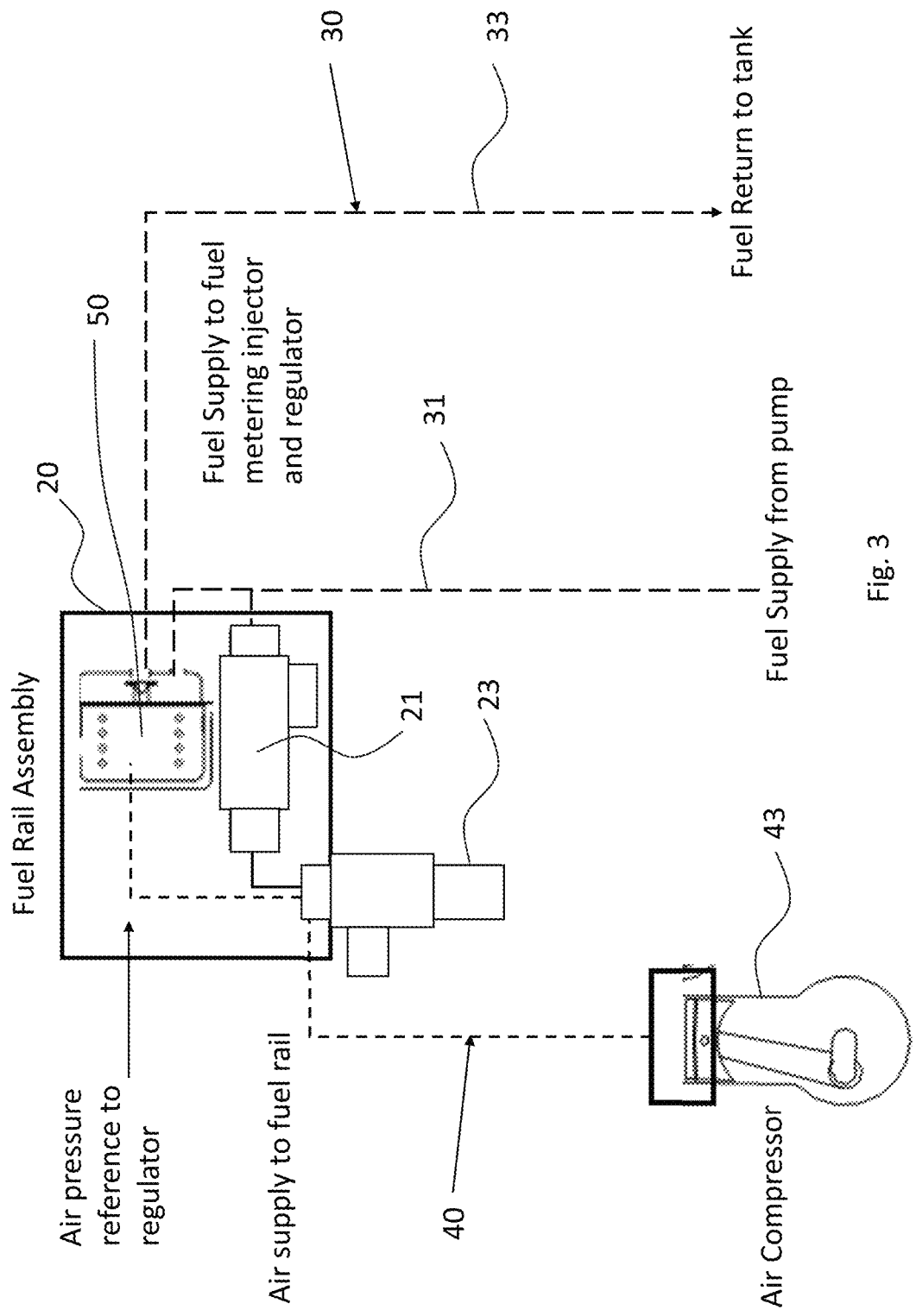
FIG. 3 is a schematic view of a prior art dual-fluid direct injection system.

The location of the fuel-air regulator 50 remotely from the fuel rail assembly 20 and in close proximity to the air compressor 43 will now be discussed briefly in contrast with a known prior art arrangement which is illustrated schematically in FIG. 3. The prior art arrangement features similar components to the dual-fluid direct injection system 10 according to the embodiment, and so similar reference numerals are used to identify similar components and parts. Such similar components include fuel rail assembly 20, air compressor 43, and the fuel-air regulator 50. As can be seen in FIG. 3, the fuel-air regulator 50 is located in close proximity to the fuel rail assembly 20 and remotely from the air compressor 43.

The standard prior art arrangement as shown in FIG. 3 would typically result in a fuel rail assembly 20 having more components than that shown in FIG. 1, and hence more propensity for the assembly to be larger in overall size, and very often one with a greater overall height. When packaged in the usual way on or adjacent the engine cylinder head, this assembly would typically result in a greater drag profile for the overall package and hence greater air resistance issues during flight of the UAV.

The present invention has greatly reduced or eliminated the drag component caused by the packaging of the fuel-air regulator, whilst also providing some other packaging benefits as described above.

The foregoing disclosure is intended to explain how to fashion and use the particular embodiment described, rather than to limit the true, intended, and fair scope and spirit of the present disclosure. The foregoing description is not intended to be exhaustive, nor to be limited to the precise forms disclosed.

It should be appreciated that various modifications can be made without departing from the principles described herein. Therefore, the principles should be understood to include all such modifications within its scope.

Features, integers, characteristics or groups described in conjunction with a particular aspect, embodiment or example of the invention are to be understood to be applicable to any other aspect, embodiment or example described herein unless incompatible therewith. All the features disclosed in this specification (including any accompanying claims, abstract and drawings) may be combined in any combination, except combinations where at least some of such features are mutually exclusive. The invention is not restricted to the details of any foregoing embodiments. The invention extends to any novel one, or any novel combination, of the features disclosed in this specification (including any accompanying claims, abstract and drawings).

The method steps, processes, and operations described herein are not to be construed as necessarily requiring their performance in the particular order discussed or illustrated, unless specifically identified as an order of performance. It is also to be understood that additional or alternative steps may be employed.

The terminology used herein is for the purpose of describing a particular example embodiment only and is not intended to be limiting.

As used herein, the singular forms "a", "an" and "the" may be intended to include the plural forms as well, unless the context clearly indicates otherwise.

Reference to any positional descriptions, such as "top", "bottom" and "side", are to be taken in context of the embodiment described and are not to be taken as limiting the invention to the literal interpretation of the term but rather as would be understood by the skilled addressee.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiment.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g. "between" versus "directly between," "adjacent" versus "directly adjacent," etc.). As used herein, the term "and/or" includes any and all combinations of one or more of the associated listed items.

Additionally, where the terms "system", "device", and "apparatus" are used in the context of the invention, they are to be understood as including reference to any group of functionally related or interacting, interrelated, interdependent or associated components or elements that may be located in proximity to, separate from, integrated with, or discrete from, each other.

Throughout this specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification and the claims that follow, unless the context requires otherwise, the word "include" or variations such as "includes" or "including", will be understood to imply the inclusion of a stated integer or group of integers but not the exclusion of any other integer or group of integers.

The invention claimed is:

1. A dual-fluid injection system for an air cooled internal combustion engine comprising an engine cylinder; a fuel rail assembly comprising a liquid fuel metering device and a fluid delivery device, said fuel rail assembly being mounted above said engine cylinder; a gas supply system comprising an air compressor; and an air delivery path extending between the air compressor and the fluid delivery device for providing pressurized air to a fluid delivery injector of the fluid delivery device, a fuel supply system adapted to deliver liquid fuel to the liquid fuel metering device, and a regulator for regulating fuel pressure with reference to air pressure, wherein the regulator is located below the fuel rail assembly and remotely from the fluid delivery device, wherein the regulator is mounted on or integrated with a housing of the air compressor.

2. The dual-fluid injection system according to claim 1 wherein the compressor comprises a compressor head and wherein the regulator is mounted on or integrated with the compressor head.

3. The dual-fluid injection system according to claim 1 wherein the regulator comprises an air chamber communicating with the air compressor by way of an air pressure reference path.

4. The dual-fluid injection system according to claim 3 wherein the air pressure reference path is separate from the air delivery path to the fluid delivery device.

5. The dual-fluid injection system according to claim 2 wherein the air compressor comprises a compression chamber and a clearance chamber communicating with the compression chamber.

6. The dual-fluid injection system according to claim 5 wherein the air reference path communicates with the clearance chamber of the air compressor.

7. The dual-fluid injection system according to claim 3 wherein the regulator is oriented with respect to the air compressor to facilitate gravity flow of fluid within the reference path back into the compressor.

8. The dual-fluid injection system according to claim 6 wherein the regulator is positioned above the clearance chamber of the compressor to facilitate such gravity flow back into the clearance chamber.

9. The dual-fluid injection system according to claim 1 wherein the air delivery path is formed or configured in a manner providing thermal insulation to pressurized air being delivered from the compressor to the fluid delivery device.

10. The dual-fluid injection system according to claim 1 wherein the air delivery path is formed or configured in a manner to be thermally separated from the fuel supply system.

11. The dual-fluid injection system according to claim 1 wherein the fuel supply system adapted to deliver liquid fuel to the liquid fuel metering device comprises a fuel line referencing fuel to the regulator, wherein the sizing of the fuel line is selected to ensure that no undesirable pressure changes are created along the fuel line from the intended fuel-air pressure difference.

12. The dual-fluid injection system according to claim 11 wherein the sizing of the fuel line and corresponding connectors are selected to control the maximum pressure drop in communicating the liquid fuel metering device to the regulator to be less than 40 kPa.

13. The dual-fluid injection system according to claim 1 wherein communication of air pressure from the compressor to the regulator is controlled so as to not introduce any delay or fluctuation in the reference pressure at the regulator.

14. The dual-fluid injection system according to claim 1 wherein the volume of air communication passages to the regulator is selected between certain minimum and maximum volumes such that fuel regulation is responsive to changes in air pressure without causing fluctuations in reference air pressure.

15. The dual-fluid injection system according to claim 1 wherein the regulator is integrated in a housing adapted to be mounted on the compressor and wherein the housing is configured and constructed to thermally insulate air in the air chamber of the regulator from fuel in an opposed fuel chamber within the regulator.

16. An internal combustion engine having a dual-fluid injection system, wherein the dual-fluid injection system is in accordance with claim 1.

17. A combination of an air cooled engine, an air compressor, and a dual-fluid injection system for delivering a metered quantity of liquid fuel into a combustion chamber of the engine entrained in air, wherein the dual-fluid injection system comprises a fuel rail assembly comprising a liquid fuel metering device and a fluid delivery device, an air delivery path extending between the air compressor and the fluid delivery device for providing pressurized air to a fluid delivery injector of the fluid delivery device, a fuel supply system adapted to deliver liquid fuel to the liquid fuel metering device, and a regulator for regulating fuel pressure with reference to air pressure, and wherein the regulator is located below the fuel rail assembly and remotely from the fluid delivery device; wherein the regulator is mounted on or integrated with a housing of the air compressor.

18. A UAV powered by an engine having a dual-fluid injection system according to claim 1.

* * * * *